United States Patent
Armstrong et al.

(10) Patent No.: US 7,962,910 B2
(45) Date of Patent: *Jun. 14, 2011

(54) SELECTIVE GENERATION OF AN ASYNCHRONOUS NOTIFICATION FOR A PARTITION MANAGEMENT OPERATION IN A LOGICALLY-PARTITIONED COMPUTER

(75) Inventors: William Joseph Armstrong, Rochester, MN (US); Naresh Nayar, Rochester, MN (US); Gregory Michael Nordstrom, Pine Island, MN (US); Timothy Joseph Torzewski, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 845 days.

This patent is subject to a terminal disclaimer.

(21) Appl. No.: 11/834,202

(22) Filed: Aug. 6, 2007

(65) Prior Publication Data
US 2007/0271425 A1    Nov. 22, 2007

Related U.S. Application Data

(63) Continuation of application No. 10/422,425, filed on Apr. 24, 2003, now Pat. No. 7,376,948.

(51) Int. Cl.
G06F 9/455    (2006.01)
G06F 9/46     (2006.01)
G06F 9/54     (2006.01)
G06F 12/08    (2006.01)

(52) U.S. Cl. .............................. 718/1; 719/318; 711/173
(58) Field of Classification Search .................. None
See application file for complete search history.

(56) References Cited

U.S. PATENT DOCUMENTS

| 5,410,700 | A  | * | 4/1995  | Fecteau et al. ............... 718/100 |
| 5,923,890 | A  |   | 7/1999  | Kubala et al. |
| 6,279,046 | B1 |   | 8/2001  | Armstrong et al. |
| 6,615,373 | B2 |   | 9/2003  | Elko et al. |
| 6,625,638 | B1 |   | 9/2003  | Kubala et al. |
| 6,687,735 | B1 |   | 2/2004  | Logston et al. |
| 6,961,806 | B1 |   | 11/2005 | Agesen et al. |

FOREIGN PATENT DOCUMENTS

| JP | 06/06-242075   | 9/1994  |
| JP | 09/09-034849   | 2/1997  |
| JP | 13/2001-147824 | 5/2001  |
| JP | 13/2001-154862 | 6/2001  |
| WO | 01/93033 A3    | 12/2001 |

* cited by examiner

*Primary Examiner* — Li B Zhen
(74) *Attorney, Agent, or Firm* — Wood, Herron & Evans, LLP; James R. Nock (57) ABSTRACT

A logically-partitioned computer, program product and method utilize a flexible and adaptable communication interface between a partition and a partition manager, which permits optimal handling of partition management operations such as state change operations and the like over a wide variety of circumstances. In particular, a partition is permitted to indicate, in connection with a request to perform a partition management operation, whether an asynchronous notification should be generated or suppressed in association with the performance of the partition management operation by a partition manager. As a result, asynchronous notifications are selectively generated in association with the performance of partition management operations based upon indications in the requests made by partitions for such operations.

1 Claim, 4 Drawing Sheets

SELECTIVE GENERATION OF AN ASYNCHRONOUS NOTIFICATION FOR A PARTITION MANAGEMENT OPERATION IN A LOGICALLY-PARTITIONED COMPUTER

CROSS-REFERENCE TO RELATED APPLICATIONS

This application is a continuation of U.S. patent application Ser. No. 10/422,425 filed on Apr. 24, 2003 by William Joseph Armstrong et al., the entire disclosure of which is incorporated by reference herein.

FIELD OF THE INVENTION

The invention relates to computers and computer software, and in particular, to communications between a partition manager and a plurality of partitions during the performance of partition management operations such as resource state changes in a logically-partitioned computer.

BACKGROUND OF THE INVENTION

Given the continually increased reliance on computers in contemporary society, computer technology has had to advance on many fronts to keep up with increased demand. One particular subject of significant research and development efforts is parallelism, i.e., the performance of multiple tasks in parallel.

A number of computer software and hardware technologies have been developed to facilitate increased parallel processing. From a software standpoint, multithreaded operating systems and kernels have been developed, which permit computer programs to concurrently execute in multiple "threads" so that multiple tasks can essentially be performed at the same time. Threads generally represent independent paths of execution for a program. For example, for an e-commerce computer application, different threads might be assigned to different customers so that each customer's specific e-commerce transaction is handled in a separate thread.

From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors.

One logical extension of parallel processing is the concept of logical partitioning, where a single physical computer is permitted to operate essentially like multiple and independent "virtual" computers (referred to as logical partitions), with the various resources in the physical computer (e.g., processors, memory, input/output devices) allocated among the various logical partitions. Each logical partition executes a separate operating system, and from the perspective of users and of the software applications executing on the logical partition, operates as a fully independent computer.

With logical partitioning, a shared program, often referred to as a "hypervisor" or partition manager, manages the logical partitions and facilitates the allocation of resources to different logical partitions. For example, a partition manager may allocate resources such as processors, workstation adapters, storage devices, memory space, network adapters, etc. to various partitions to support the relatively independent operation of each logical partition in much the same manner as a separate physical computer.

In connection with managing logical partitions, it may be desirable for individual partitions to be able to manage and interact with the various resources allocated to those partitions. To enable such management functionality, a partition manager often supports an interface through which a partition can request performance of certain partition management operations by the partition manager. Given, however, that each partition executes in a separate memory space from a partition manager, the communication between a partition and partition manager must follow a regimented protocol that maintains the barriers put in place between the partition and the partition manager.

Different types of partition management operations, however, may require different actions to be undertaken by a partition manager. Furthermore, these actions may require different degrees of effort on the part of the partition manager. Some partition management operations, for example, may be processed immediately, and may not require a partition to wait to be advised of whether a particular operation has been completed. Other partition management operations, on the other hand, may require substantial effort on the part of the partition manager, and may require access to various hardware devices in a computer, which can require a substantial amount of time to complete. In these latter instances, it may be inefficient to require a partition to wait for the partition manager to complete the operation and notify the partition that the operation has been completed.

For example, one type of partition management operation that may be initiated by a partition is a resource state change operation. In particular, resources in a logically-partitioned computer, e.g., processors, memory, input/output devices, storage devices, display devices, communication devices, and adapters therefor (whether real or virtual), are typically represented by objects in the memory space of a partition manager. The objects are capable of interacting with the actual devices to perform certain management operations on the devices. Moreover, the objects typically store state information about their associated devices, and as certain resources are allocated to particular partitions, the objects representing those resources are updated to reflect such ownership.

A partition that uses a particular resource managed by a partition manager may have the ability to update the state of that resource through a partition management operation. For example, it may be desirable for a partition to be able to power a resource on or off, to enable or disable access to the resource, or to release the resource for use by other partitions. However, depending on the particular type of resource that is being updated, the amount of time and processing overhead actually required to effect the state change may vary substantially. As a result, it has been difficult to provide a common interface between a partition and a partition manager that is capable of efficiently handling state change operations for different types of resources.

One possible type of interface that might be implemented to enable a partition to initiate a state change with a partition manager is a purely event-driven interface, whereby a partition sends an event to a partition manager to request the state change, and then waits for a return event from the partition manager when the operation is complete. One disadvantage of such an interface is that the partition is typically always forced to wait for the return event, even when the object is already in the requested state, or when the object can immediately be updated to the requested state, which can result in added response time and increased system overhead. In addition, correlation of a return event with the request event may be problematic in some implementations.

Another type of interface that might be implemented to enable a partition to initiate a state change with a partition manager is to provide a call-based interface where a partition calls the partition manager and obtains a return code therefrom indicating that the requested state change is in progress. Subsequent calls may be made until a success return code is returned once the requested state change completes. One disadvantage of such an interface is that a partition is typically required to spin or busy wait for the state change to occur, again tying up system resources, and decreasing system throughput.

It is believed that a root problem associated with the aforementioned interface implementations results directly from the significantly different response times and system overhead that may be experienced when performing the same type of partition management operation for different types of resources, and in different sets of circumstances. While certain interface types may provide optimal results for some types of resources, those same interface types may provide suboptimal results for others.

Therefore, a substantial need has arisen for a more flexible and efficient manner of handling partition management operations in a logically-partitioned computer, particularly to address the different circumstances that may arise for operations performed on different types of resources that may reside in a logically-partitioned computer.

SUMMARY OF THE INVENTION

The invention addresses these and other problems associated with the prior art by providing an logically-partitioned computer, program product and method that utilize a flexible and adaptable communication interface between a partition and a partition manager, which permits optimal handling of partition management operations such as state change operations and the like over a wide variety of circumstances. In particular, embodiments consistent with the invention support the ability of a partition to indicate, in connection with a request to perform a partition management operation, whether an asynchronous notification should be generated or suppressed in association with the performance of the partition management operation by a partition manager. As a result, asynchronous notifications are selectively generated in association with the performance of partition management operations based upon indications in the requests made by partitions for such operations.

By doing so, a common interface may be provided between a partition and a partition manager whereby, when it is determined that optimal results are obtained for a particular partition management operation when asynchronous notification is used to report the completion of an operation, a partition may request such notification in connection with requesting performance of the operation, thus enabling other work to be performed by the partition while waiting for the notification. Likewise, when it is determined that optimal results are obtained for a particular partition management operation when asynchronous notification is not used (which typically requires a partition to utilizing polling to determine when the operation is complete), a partition may suppress any such notification in connection with requesting performance of the operation, thus leaving the partition the responsibility of checking on the completion status of the operation at an appropriate time. Furthermore, in some instances where immediate (synchronous) notification of completion of a partition management operation is appropriate, asynchronous notification may also be suppressed, thus eliminating any need for a partition to wait for additional notification and/or perform further checks for completion of the operation.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter provide the capability for selectively generating an asynchronous notification to a partition in response to a request generated by the partition for the performance of a partition management operation. A partition management operation consistent with the invention may be considered to incorporate practically any operation capable of being initiated by a partition and performed by a partition manager, typically an operation that, at least in some circumstances, takes some non-trivial amount of time to complete. For example, the embodiments discussed below focus on various types of state change operations initiated on system resources such as processors, memory, input/output devices, and various adapters therefor. Other types of partition management operations that may utilize the herein-described interface may include, for example, traversing large databases or tables to locate, add or remove partition resource assignments, such as I/O slot databases, hardware page tables (HPT's), translation control entry (TCE) tables, etc. The invention therefore is not limited to the particular operations discussed herein.

In addition, as will become more apparent below, the requests for partition management operations, as well as the asynchronous notifications selectively generated in response thereto, may each take a number of different forms consistent with the invention. For example, a request for a partition management operation may be implemented via supervisor function or method calls, messages, events, interrupts to the partition manager, etc. Likewise, asynchronous notifications may be implemented via function or method calls, messages, events, interrupts, etc. In the illustrated embodiments, for example, requests are implemented as function calls to an interface supported by a partition manager, while asynchronous notifications are implemented as events passed to partition-specific event queues. It will be appreciated, however, that the invention is not limited to these specific implementations.

Figure 1:
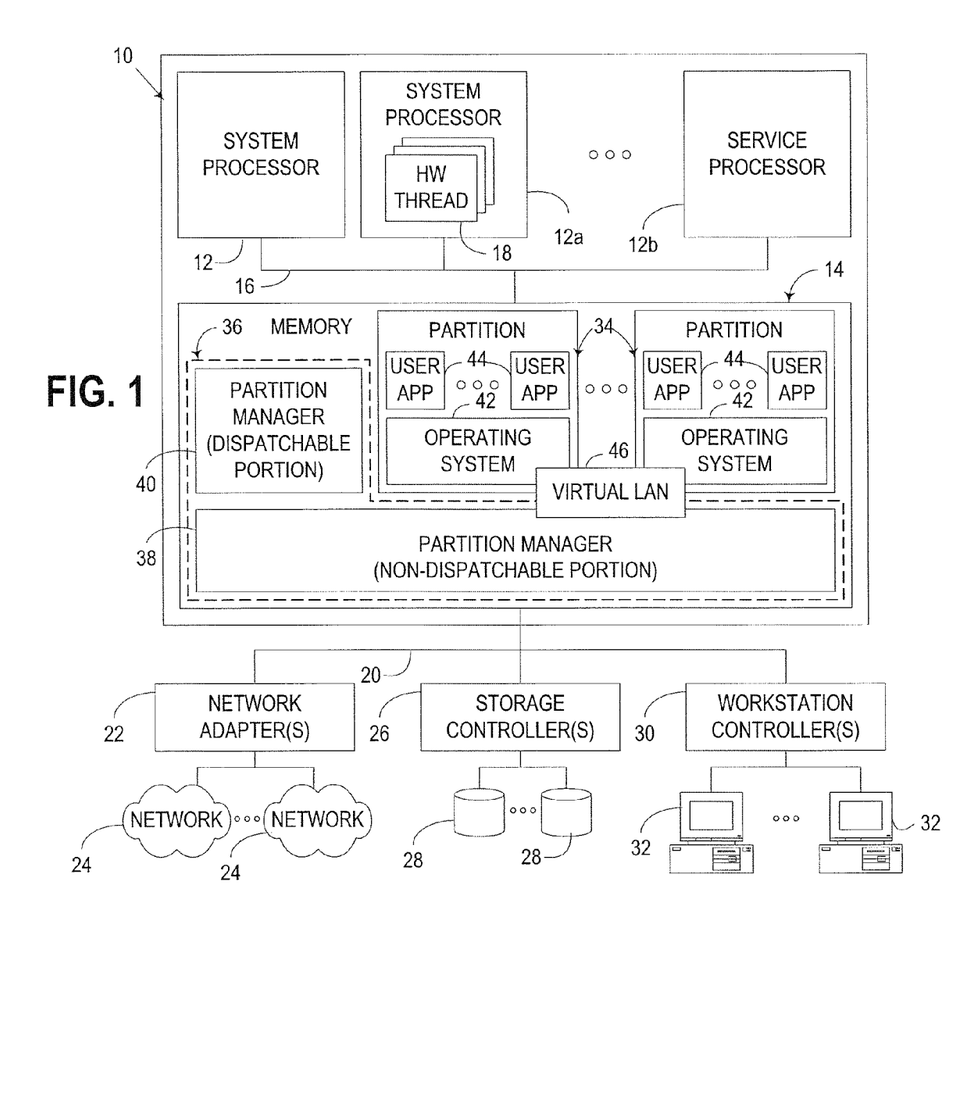
FIG. 1 is a block diagram of the principal hardware components in a logically-partitioned computer consistent with the invention.

Turning now to the Drawings, wherein like numbers denote like parts throughout the several views, FIG. 1 illustrates the principal hardware components in a logically-partitioned computer 10 consistent with the invention. Computer 10 generically represents, for example, any of a number of multi-user computers such as a network server, a midrange computer, a mainframe computer, etc., e.g., an IBM eServer computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like).

Computer 10 generally includes one or more processors 12 coupled to a memory 14 via a bus 16. Each processor 12 may be implemented as a single threaded processor, or as a multithreaded processor, such as with processor 12a, which is shown incorporating a plurality of hardware threads 18. For the most part, each hardware thread 18 in a multithreaded processor 12a is treated like an independent processor by the software resident in the computer.

In addition, as is also illustrated in FIG. 1, one or more of processors 12 (e.g., processor 12b) may be implemented as a service processor, which is used to run specialized firmware code to manage system initial program loads (IPL's), and to monitor, diagnose and configure system hardware. Generally, computer 10 will include one service processor and multiple system processors, which are used to execute the operating systems and applications resident in the computer, although the invention is not limited to this particular implementation. In some implementations, a service processor may be coupled to the various other hardware components in the computer in manners other than through bus 16.

Memory 14 may include one or more levels of memory devices, e.g., a DRAM-based main storage, as well as one or more levels of data, instruction and/or combination caches, with certain caches either serving individual processors or multiple processors as is well known in the art. Furthermore, memory 14 is coupled to a number of types of external devices via a bus 20, e.g., one or more network adapters 22 (for interfacing the computer with network(s) 24), one or more storage controllers 26 (for interfacing the computer with one or more storage devices 28) and one or more workstation controllers 30 (for interfacing with one or more terminals or workstations 32 via a plurality of workstation adapters).

FIG. 1 also illustrates in greater detail the primary software components and resources utilized in implementing a logically partitioned computing environment on computer 10, including a plurality of logical partitions 34 managed by a partition manager or hypervisor 36. Any number of logical partitions may be supported as is well known in the art, and the number of logical partitions resident at any time in a computer may change dynamically as partitions are added or removed from the computer.

In the illustrated IBM eServer-based implementation, partition manager 36 is comprised of two layers of program code. The first, referred to herein as a non-dispatchable portion 38, is implemented within the firmware, or licensed internal code (LIC), of computer 10, which is utilized to provide a low level interface to various hardware components while isolating higher layers, e.g., the operating systems, from the details of the hardware access. The firmware may also communicate with a service processor such as service processor 12b. The non-dispatchable portion 38, which is also referred to herein as "PLIC", provides many of the low level partition management functions for computer 10, e.g., page table management, etc. The non-dispatchable portion 38 also has no concept of tasks, and is accessible principally via function calls from higher layers of software.

The second layer of program code in partition manager 36 is referred to herein as a dispatchable portion 40, or alternatively "PHYP". In contrast to non-dispatchable portion 38, which has no concept of tasks, is run with memory relocation off, and is accessible via supervisor function calls from higher layers of software, the dispatchable portion 40 has the concept of tasks (like any operating system), and is run with memory relocation on. The dispatchable portion typically executes in much the same manner as a partition, except that it is hidden from the user. The dispatchable portion generally manages higher level partition management operations such as creating and deleting partitions, concurrent hardware maintenance, allocating processors, memory and other hardware resources to various partitions 34, etc.

Each logical partition 34 is typically statically and/or dynamically allocated a portion of the available resources in computer 10. For example, each logical partition may be allocated one or more processors 12 and/or one or more hardware threads 18, as well as a portion of the available memory space. Logical partitions can share specific hardware resources such as processors, such that a given processor is utilized by more than one logical partition. In the alternative hardware resources can be allocated to only one logical partition at a time.

Additional resources, e.g., mass storage, backup storage, user input, network connections, display devices, and the I/O adapters therefor, are typically allocated to one or more logical partitions in a manner well known in the art. Resources may be allocated in a number of manners, e.g., on a bus-by-bus basis, or on a resource-by-resource basis, with multiple logical partitions sharing resources on the same bus. Some resources may even be allocated to multiple logical partitions at a time. In addition, some resources may be "virtual" in nature, e.g., virtual network adapters used in a virtual local area network.

Each logical partition 34 utilizes an operating system 42 that controls the primary operations of the logical partition in the same manner as the operating system of a non-partitioned computer. For example, each operating system 42 may be implemented using the OS/400 operating system available from International Business Machines Corporation.

Each logical partition 34 executes in a separate, or independent, memory space, and thus each logical partition acts much the same as an independent, non-partitioned computer from the perspective of each user application (user app) 44 that executes in each such logical partition. As such, user applications typically do not require any special configuration for use in a partitioned environment.

Given the nature of logical partitions 34 as separate virtual computers, it may be desirable to support inter-partition communication to permit the logical partitions to communicate with one another as if the logical partitions were on separate physical machines. As such, in some implementations it may be desirable to support a virtual local area network (LAN) 46 in non-dispatchable portion 38 to permit logical partitions 34 to communicate with one another via a networking protocol such as the Ethernet protocol. Other manners of supporting communication between partitions may also be supported consistent with the invention.

It will be appreciated that other logically-partitioned environments may be utilized consistent with the invention. For example, rather than utilizing a dispatchable portion 40 that is separate from any partition 34, the functionality of the dispatchable portion may be incorporated into one or more logical partitions in the alternative.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
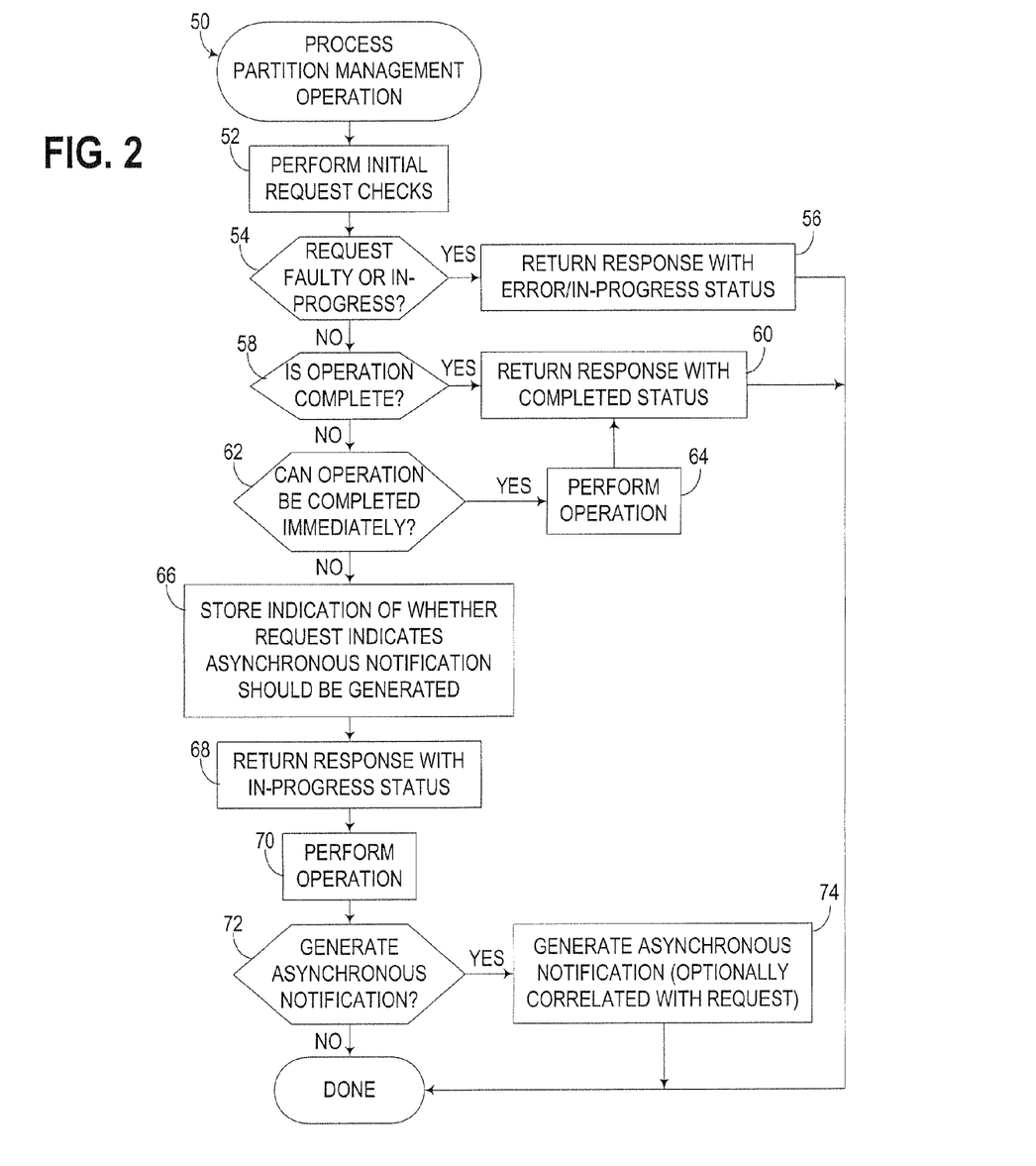
FIG. 2 is a flowchart illustrating the program flow of a process partition management operation routine executed by the partition manager of FIG. 1.

Now turning to FIG. 2, an exemplary process partition management operation routine 50, capable of being executed by partition manager 36, is illustrated in greater detail. Routine 50 represents a basic routine for handling a number of different types of partition management operations, and furthermore supports the ability to support three principal manners of alerting a partition of the completion of a partition management operation. In particular, routine 50 supports the ability to generate a synchronous (immediate) notification in instances where a partition management operation may be completed immediately, or in a relatively short period of time, whereby the synchronous response is returned to a partition directly in response to the request generated by the partition. In addition, routine 50 supports the ability to generate an asynchronous notification when so indicated in the request, and in the event that a partition management operation is incapable of being completed immediately. In addition, routine 50 supports the ability to suppress an asynchronous notification if so indicated in a request, thereby permitting a partition to poll the partition manager to detect the completion of a partition management operation. It should be noted that, even when an asynchronous notification is requested, or polling is expected to be used by a partition, a synchronous notification is still typically returned in response to a request, typically indicating that the operation is not yet complete.

It is believed that, with the ability to alert a partition of the completion of a partition management operation using any of the three aforementioned mechanisms, practically any partition management operation may be supported through this common communications mechanism, with the response mechanism for indicating completion of an operation to the initiating partition capable of being optimized for the particular operation or type of operation.

Routine 50 is executed in the partition manager in response to a request generated by a partition to perform a partition management operation. As will become more apparent below, it is expected that a partition will specify in association with the request whether an asynchronous notification should be generated.

Routine 50 begins in block 52 by performing initial checks on the request, e.g., to determine whether the request meets a required format, as well as to determine whether the operation has already been completed, or has already been initiated but is still in progress. Next, block 54 determines whether the request is faulty as a result of the checks performed in block 52, or if the operation requested by the request has already been initiated, but is still in progress. If so, control passes to block 56 to return a response to the partition, and indicating with the response that an error has occurred, or that the operation is still in progress, as appropriate. The response generated in block 56 is typically a synchronous notification supplied directly in response to the request, e.g., via a return code to a function call. Once the response is returned, routine 50 is complete.

Returning to block 54, if the request is not faulty or still in progress, control passes to block 58 to determine whether the operation has already been completed. If so, control passes to block 60 to return a response to the partition with a completed status, and terminate the routine. As noted above, the response generated in block 60 may be a synchronous response to the request. Also, the response may indicate whether the operation completed successfully or whether a failure occurred.

Returning again to block 58, if the operation is not complete, control passes to block 62 to determine whether the operation is capable of being completed synchronously or immediately, i.e., within a relatively short period of time. If so, control passes to block 64 to initiate performance of the operation. Once the operation is complete, block 64 passes control to block 60 to return a response to the partition indicating the completed status. Routine 50 is then complete.

Returning to block 62, if it is determined that the operation cannot be completed immediately, control passes to block 66 to store an indication of whether the request indicates that an asynchronous notification should be generated in association with performance of the partition management operation. For example, block 66 may analyze the request or a parameter or variable associated therewith to determine whether the partition has requested that an asynchronous notification be generated upon completion of the requested operation. As another example, a correlation token provided with the request, e.g., as described below in connection with FIGS. 3-5, may be stored in block 66. Other manners of determining whether the request is associated with an indication that an asynchronous notification should be generated may be used in the alternative.

Next, block 68 returns a response to the request specifying an in-progress status for the requested operation. Typically, the response generated in block 68 is a synchronous response provided immediately to the partition in reply to the request.

Next, block 70 initiates performance of the requested operation. Once the operation is complete, control then passes to block 72 to determine whether an asynchronous notification should be generated, e.g., by accessing the indication stored in block 66. If the stored indication indicates that an asynchronous notification should be generated, block 72 passes control to block 74 to generate the required asynchronous notification, whereby routine 50 is then complete The asynchronous notification also typically provides a status indication, which may include, for example, an indication that the operation is complete, along with a success or failure indication. In addition, other data relevant to the operation (e.g., data requested in association with the request), may also be provided in the notification. Furthermore, the asynchronous notification may include information suitable for correlating the notification with the original request, e.g., by returning a correlation token originally provided with the request.

Returning to block 72, if the stored indication indicates that an asynchronous notification should not be generated, block 72 bypasses block 74, thereby suppressing the generation of an asynchronous notification. Routine 50 is then complete.

It may be seen that, in situations where a request for a partition management operation requests an operation that is capable of being performed immediately, routine 50 will proceed through blocks 52, 54, 58, 62, 64, and 60, completing the operation synchronously and returning an appropriate response. In such an event, no further work is required of the partition in monitoring the completion of the partition management operation.

With respect to a partition management operation that is not capable of being completed immediately, and where the partition requests an asynchronous notification, routine 50 typically proceeds through blocks 52, 54, 58, 62, 66, 68, 70, 72, and 74 to generate an asynchronous notification upon completion of the operation. As such, a partition, once a request has been issued to perform a partition management operation, may proceed with other activities while the operation is being completed. Moreover, via the asynchronous notification, the partition will be notified and execution will be diverted to handle the notification in an appropriate manner, once the operation completes. Also, by virtue of the synchronous response made using an in-progress status (block 68), the partition is made aware of the fact that the operation is still being performed, and that other work may be performed while the operation is completing.

In the event that an operation cannot be completed immediately, and where the partition elects to poll the partition manager, rather than receive an asynchronous notification, routine 50 proceeds through blocks 52, 54, 58, 62, 66, 68, 70, and 72, but bypasses block 74, such that the only response generated by the partition manager in reply to the initial request issued by the partition is the response incorporating the in-progress status in block 68. Thereafter, when it is desired for the partition to poll the partition manager to determine the status of the operation, the partition may invoke a different routine to poll the status of the operation.

Alternatively, and as illustrated in FIG. 2, the partition may also poll the partition manager for the status of the operation by issuing another request for the same partition management operation, resulting in routine 50 being called to process the new request. If the operation is not yet complete, the operation will still have an in-progress status, and as such, on the subsequent request, routine 50 will perform initial request checks in block 52, and determine in block 54 that the request is still in-progress. By doing so, program flow will be diverted to block 56 to return a response with the in-progress status, and terminate the routine.

Once the operation is complete, however, the subsequent request will be processed by routine 50 by performing initial request checks in block 52, determining that the request is not faulty or in-progress in block 54, and determining in block 58 that the operation is now complete. Control will therefore be diverted to block 60 to return a response with the appropriate completed status, whereby the routine will terminate, and the partition will thus be notified that the partition management operation is complete.

Typically, it will be desirable for all subsequent polling requests to use the same request format as the original request, i.e., using the same parameters. The invention, however, is not limited to such an implementation.

The manner in which a partition determines whether or not an asynchronous notification should be generated may vary depending upon the type of operation requested. For example, it may be determined that a particular operation will require access to an external hardware device that requires a relatively long period of time to complete. In such an instance, it may be desirable to suppress the generation of an asynchronous notification, and instead set a timer in the partition that waits a sufficient period of time before polling by the partition is undertaken. On the other hand, a partition may wish to request the generation of an asynchronous notification such that additional work can be performed subsequent to issuing the request, with a handler routine utilized to divert execution to handle the asynchronous notification when it is ultimately received. In some circumstances, the partition manager may return an estimated time for completion, whereby the partition may suppress asynchronous notification and set a timer to poll the partition manager for completion of the operation. It is important to note, however, that even in the event where an asynchronous notification is generated, routine 50 still supports the ability to suppress the asynchronous notification if it is determined that the operation may be completed in a relatively short period of time, such that the initial synchronous notification supplied to the partition subsequent to the request may indicate a completed status for the operation.

Figure 3:
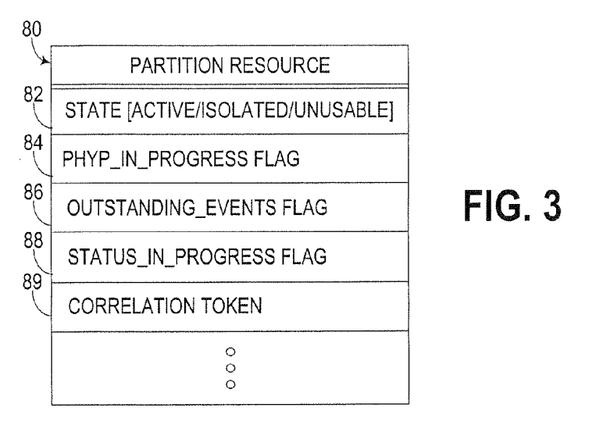
FIG. 3 is a block diagram of an exemplary data structure for a partition resource maintained in the logically-partitioned computer of FIG. 1.
Figure 4:
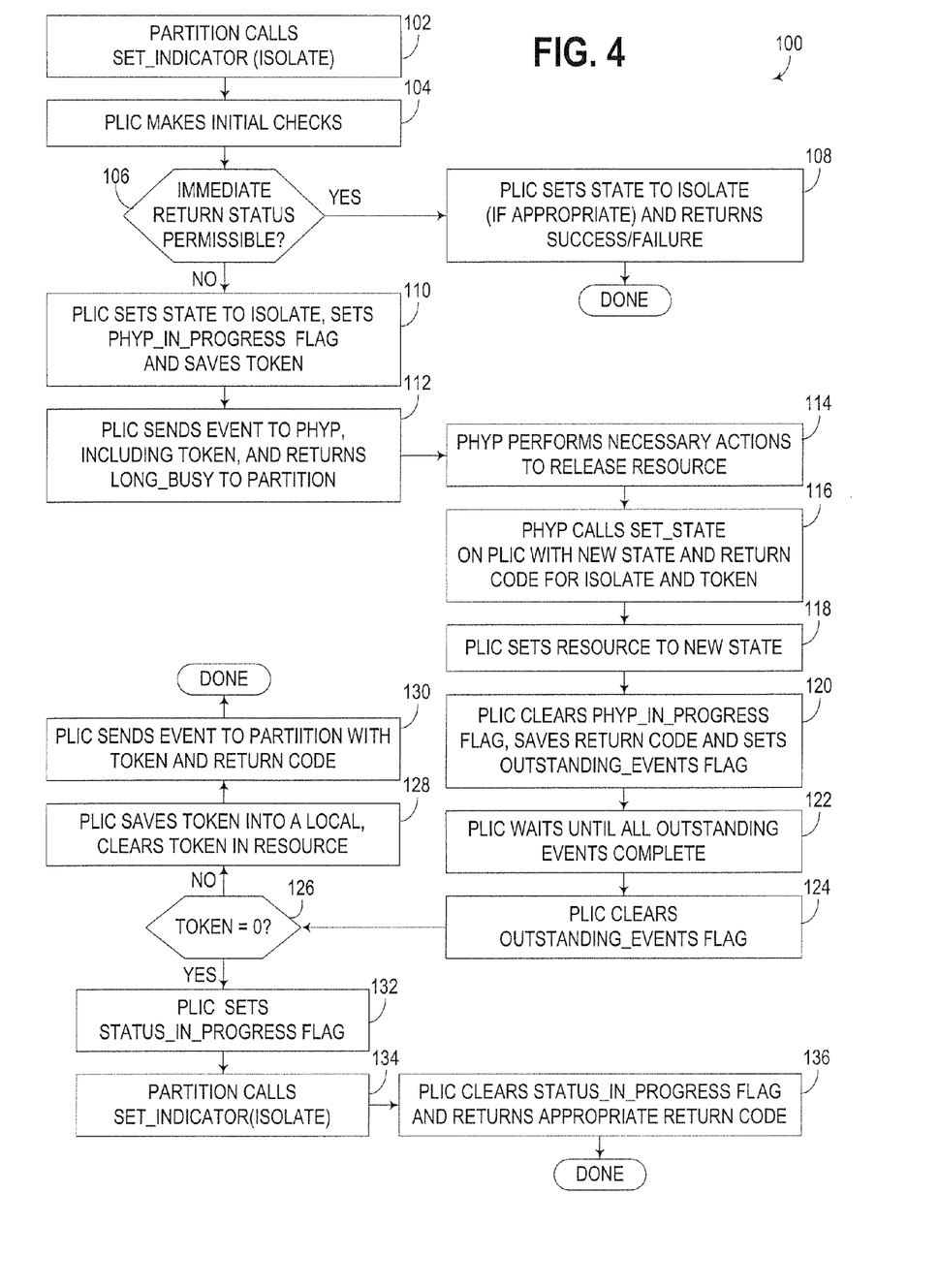
FIG. 4 is a flowchart illustrating the performance of an exemplary resource state change operation performed by the logically-partitioned computer of FIG. 1.
Figure 5:
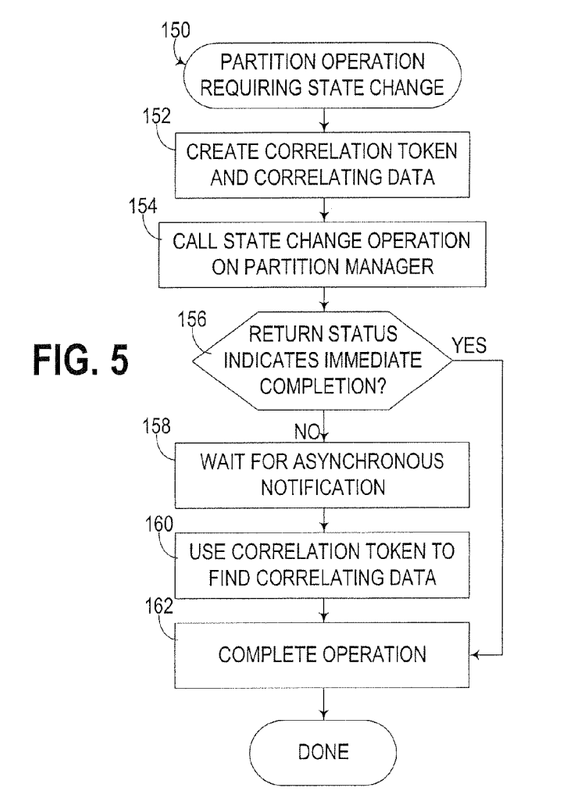
FIG. 5 is a flowchart illustrating the performance of an exemplary partition operation requiring a resource state change in the logically-partitioned computer of FIG. 1.

While routine 50 may be utilized in connection with a wide variety of partition management operations, one particularly useful type of operation is a state change operation. As noted above, in many logically-partitioned computers, it may be desirable to represent resources in a partition manager using objects. Moreover, each such object may have a state that is used to manage the accessability of the associated resource to various partitions resident in the computer. FIGS. 3-5, for example, illustrate one specific implementation of the invention in managing resources that are capable of being set to "active," "unusable," and "isolated" states. An "active" state for an object indicates that the resource is currently being utilized by a partition. The "unusable" state indicates that no partition is claiming ownership of the resource, and as such, the resource is available for allocation to another partition. The "isolated" state indicates that, while the particular partition is not currently using the resource, the partition is not willing to release the resource for utilization by another partition. In such a scheme, the partition manager supports various partition management operations to isolate or unisolate a resource, make the resource usable or unusable, and poweron and off a resource that can be individually and uniquely assigned to a partition from among a pool of like resources that are assignable to any of a plurality of partitions.

It will be appreciated that some of the aforementioned partition management operations will require access to the hardware devices associated with the appropriate resource objects. For example, powering a device on or off, or isolating or unisolating a resource may require operations to be initiated on the devices themselves, along with additional logical operations performed in the partition manager to initialize or clean-up data structures in the partition manager. Other operations, e.g., making a resource usable or unusable, may only require logical operations, and may not require direct access to a device. It will be appreciated that these various operations may require comparatively more or less processing overhead, and may be completed relatively quickly or slowly, depending both upon the type of operation and the particular resource involved. As such, it may be desirable to selectively generate or suppress asynchronous notifications for each different operation so as to optimize the performance of the system when performing these various operations.

FIG. 4, for example, illustrates the exemplary program flow that may occur during the performance of an "isolate" state change operation on a partition resource represented, for example, by an object 80 shown in FIG. 3. In this illustrative embodiment, it is assumed that a partition will create an object in the partition memory space representing a higher level operation to be performed, while the partition manager maintains an object such as object 80 to represent the partition resource being managed by a partition management operation conducted in connection with the higher level operation in the partition.

In this instance, object 80 is shown including a state field 82, representing the current state of the resource. Fields 84, 86, and 88 respectively store flags used in connection with updating the state of the partition resource. Field 89 stores a correlation token provided in connection with a request to perform a partition management operation, and returned with an asynchronous notification, if so required.

With respect to fields 84-88, field 84 stores a PHYP_IN_PROGRESS flag that indicates that an "isolate" event has been sent to the dispatchable (PHYP) portion of the partition manager, and that PHYP is not finished.

Field 86 stores an OUTSTANDING_EVENTS flag that indicates that PHYP is done, but the non-dispatchable portion (PLIC) of the partition manager needs to complete the processing of all of the events for the resource object before the resource can be considered isolated.

Field 88 stores a STATUS_IN_PROGRESS flag that indicates that the partition manager's processing of the operation is complete, but the partition has yet to retrieve the return code indicating the operation is complete.

It will be appreciated that additional information will typically be stored in object 80, including various configuration data for the actual resource represented by the object. In addition, other data structures than that illustrated in FIG. 3 may be utilized to maintain the state of a resource object consistent with the invention.

It is also assumed for the purposes of this example that an indication of whether an asynchronous notification should be generated is made via a correlation token that is passed with the request, and that furthermore is passed back to a partition with the asynchronous notification. In the illustrated embodiment, the correlation token is a pointer to a C++ object or function call that is representative of an operation in the partition, and that will accept an event pointer on a virtual done method on the object. As such, if the return from the partition manager call indicates that work has been started, but is not yet complete, the partition is able to use an event message parser to continue the higher level operation. Otherwise, if the partition manager request is complete, the partition can immediately continue the higher level operation. The partition event message parser will typically invoke the done method on the C++ object once the operation is complete, thus permitting the execution of the higher level operation to continue.

To indicate that no asynchronous notification should be generated, a correlation token value of zero is used. It will be appreciated, however, that other manners of indicating that no notification should be generated may be used in the alternative, e.g., various flags or other fields in a request, variables that accessible to the partition manager, or in other manners that will be apparent to one of ordinary skill in the art having the benefit of the instant disclosure. Moreover, it will be appreciated that correlation tokens consistent with the invention may be configured in a number of alternate manners. For example, a correlation token may be represented by an integer that operates as an index into an array of pointers to various partition objects, or any other key that allows a lookup to correlate an event or notification with the request or operation with which the response is associated. Other alternate implementations of correlation tokens, e.g., function calls, control blocks, data structure addresses, etc., may also be used in the alternative.

It will be appreciated, therefore, that one desirable use of a correlation token, among others, is to correlate an asynchronous notification with the original request, such that processing delayed in a partition pending completion of a partition management operation can resume upon receipt of the asynchronous notification.

FIG. 4 illustrates the sequence of operations that may occur in connection with isolating a partition resource. In particular, FIG. 4 illustrates at 100 an exemplary isolate state change routine performed in logically-partitioned computer 10 to isolate a partition resource.

Routine 100 is initiated in block 102 by a partition calling a SET_INDICATOR(ISOLATE) function on the partition manager to set the state of the resource of interest to "isolate." A correlation token, either a pointer to an object that should receive an asynchronous notification, or a zero value that indicates that asynchronous notification should be suppressed, accompanies the request. Next, in block 104, PLIC makes initial checks of the function call, and in block 106, determines whether an immediate return status is permissible, e.g., if it is initially determinable that the function call is invalid, if it is determined that the resource is already isolated, or if it is determined that the requested operation has already been performed or was initiated earlier but is still in progress.

If an immediate return status is permissible, control passes to block 108, where PLIC sets the state of the resource to "isolate" (if appropriate), and returns a SUCCESS or FAILURE status as appropriate. Processing of the "isolate" request is therefore complete.

Returning to block 106, if an immediate return status is not permissible, control passes to block 110, where PLIC sets the state of the resource object to "isolate," sets the PHYP_IN_PROGRESS flag, and saves the correlation token provided with the partition function call. Next, in block 112, PLIC sends an "isolate" event to PHYP, including the token, and returns a LONG_BUSY return code to the partition, indicating thereto that the isolate operation is still in progress.

Next, in block 114, PHYP performs the necessary actions to release the resource. For example, for an isolate operation, PHYP may need to analyze the tables managed thereby to make sure that no references still exist to the resource, a process similar to garbage collection. For other types of resource management operations, other activities may be performed.

Next, in block 116, PHYP calls SET_STATE on PLIC with the new state, and returns a code for "isolate," along with the correlation token. Next, in block 118, PLIC sets the resource to the new state, and in block 120, PLIC clears the PHYP_IN_PROGRESS flag, saves the return code, and sets an OUTSTANDING_EVENTS flag.

Next, in block 122, PLIC waits until all outstanding events are complete, as other outstanding events may need to be processed before a resource is truly isolated. Detection of when all events have been processed may be performed in a number of manners, for example, by providing a function on the resource that is invoked by a queue when the count of outstanding events reaches zero.

Once all outstanding events complete, in block 124, PLIC clears the OUTSTANDING_EVENTS flag, and control passes to block 126 to determine whether the correlation token provided with the request equals zero. As noted above, a zero value for the token indicates to the partition manager that no asynchronous notifications should be generated, and that the partition will poll the partition manager to detect completion of the operation.

As such, if the token is not equal to zero, block 126 passes control to block 128, where PLIC saves the token into a local copy, then clears the token in the partition resource object. Then, in block 130, PLIC sends an event to the partition with the token and a return code indicating that the operation is complete, and optionally, indicating whether the operation was a success or a failure. Processing of the isolate operation is then complete.

Returning to block 126, if the token is in fact zero, control passes instead to block 132 where PLIC sets the STATUS_IN_PROGRESS flag on the resource object. No further activities occur in the partition manager with respect to the isolate operation until the partition attempts to poll the partition manager for the status of the operation. Therefore, as shown in block 134, once the operation is complete, and the partition again calls SET_INDICATOR(ISOLATE) on the partition manager, the STATUS_IN_PROGRESS flag will indicate that the operation is complete other than the notification being provided to the partition. As such, PLIC is able in block 136 to clear the STATUS_IN_PROGRESS flag and return the appropriate return code, indicating that the operation is complete. Processing of the isolate operation is then complete.

As noted above, return of an appropriate return code to a partition, including the correlation token, will typically invoke an operation on the associated object in the partition to invoke a done method on the object and complete processing of the operation represented by that object.

It will be appreciated that setting the state of a resource object to other states will proceed in a similar manner to that described above in connection with FIG. 4. Moreover, it will be appreciated that an implementation of the aforementioned functionality in software is well within the abilities of one of ordinary skill in the art having the benefit of the instant disclosure.

FIG. 5 next illustrates, from the perspective of a partition, the performance of a higher level partition operation that requires a resource state change. In particular, a routine 150 is illustrated, which begins in block 152 by creating a correlation token and correlating data. It is assumed for the purposes of this example that an asynchronous notification is desired, so a non-zero correlation token is created.

Next, in block 154, the partition calls the requisite state change operation on the partition manager, e.g., as described above in connection with FIG. 4, including the created correlation token. The partition thereafter waits for a return code, which, when received, is analyzed in block 156 to determine if the return status indicates an immediate completion of the state change operation. If not, control passes to block 158 to wait for the asynchronous notification. Once received, control passes to block 160 to use the correlation token returned in the asynchronous notification to find the correlating data for the operation. Thereafter, control passes to block 162 to complete the operation. In addition, returning to block 156, if an immediate completion is indicated by the return status, control passes directly to block 162. Upon completion of block 162, the partition operation is complete.

It will be appreciated that a wide variety of partition operations may be performed in the general manner illustrated in FIG. 5. Moreover, a wide variety of state change operations that may be performed in connection with these partition operations are contemplated within the context of the invention.

Various modifications to the herein-described embodiments will be apparent to one of ordinary skill in the art having the benefit of the instant disclosure. Therefore, the invention lies in the claims hereinafter appended.

What is claimed is:

1. A method of performing a partition management operation in a logically-partitioned computer, the method comprising:
    receiving a request for a partition management operation from a partition, the request indicating whether an asynchronous notification should be generated upon completion of the partition management operation;
    performing the partition management operation in response to the request, including selectively generating an asynchronous notification if so indicated by the request, and suppressing generation of the asynchronous notification if so indicated by the request; and
    after performing the partition management operation, receiving a second request from the partition to poll for completion of the partition management operation if the request does not indicate that the asynchronous notification should be generated upon completion of the partition management operation,
    wherein the second request comprises another request for the partition management operation, the method further comprising processing the second request by generating a notification that indicates whether the partition management operation has completed, and wherein the second request has the same parameters as the first request.

* * * * *